US007664263B2

(12) United States Patent
Moskowitz

(10) Patent No.: US 7,664,263 B2
(45) Date of Patent: Feb. 16, 2010

(54) METHOD FOR COMBINING TRANSFER FUNCTIONS WITH PREDETERMINED KEY CREATION

(76) Inventor: Scott A. Moskowitz, 16711 Collins Ave., #2505, Miami, FL (US) 33160

( * ) Notice: Subject to any disclaimer, the term of this patent is extended or adjusted under 35 U.S.C. 154(b) by 1222 days.

(21) Appl. No.: 10/602,777

(22) Filed: Jun. 25, 2003

(65) Prior Publication Data

US 2004/0086119 A1    May 6, 2004

Related U.S. Application Data

(63) Continuation of application No. 09/046,627, filed on Mar. 24, 1998, now Pat. No. 6,598,162.

(51) Int. Cl.
*G06K 9/48*        (2006.01)
*G06F 3/14*        (2006.01)

(52) U.S. Cl. ........................ 380/205; 380/206; 380/210; 380/236; 380/239; 713/176

(58) Field of Classification Search ................. 380/205, 380/206, 210, 236, 239; 713/176
See application file for complete search history.

(56) References Cited

U.S. PATENT DOCUMENTS

| 3,947,825 | A | | 3/1976 | Cassada |
| 3,984,624 | A | | 10/1976 | Waggener |
| 3,986,624 | A | | 10/1976 | Cates, Jr. et al. |
| 4,038,596 | A | | 7/1977 | Lee |
| 4,200,770 | A | | 4/1980 | Hellman et al. |
| 4,218,582 | A | | 8/1980 | Hellman et al. |
| 4,339,134 | A | | 7/1982 | Macheel |
| 4,390,898 | A | * | 6/1983 | Bond et al. ................. 380/214 |
| 4,405,829 | A | | 9/1983 | Rivest et al. |
| 4,424,414 | A | | 1/1984 | Hellman et al. |
| 4,528,588 | A | | 7/1985 | Lofberg |
| 4,672,605 | A | | 6/1987 | Hustig et al. |
| 4,748,668 | A | | 5/1988 | Shamir et al. |
| 4,789,928 | A | | 12/1988 | Fujisaki |
| 4,827,508 | A | | 5/1989 | Shear |
| 4,876,617 | A | | 10/1989 | Best et al. |

(Continued)

FOREIGN PATENT DOCUMENTS

EP        0372601 A1    6/1990

(Continued)

OTHER PUBLICATIONS

Schneier, Bruce, Applied Cryptography, 2nd Ed., John Wiley & Sons, pp. 9-10, 1996.

(Continued)

*Primary Examiner*—Jung Kim
*Assistant Examiner*—Izunna Okeke

(57) ABSTRACT

A method for combining transfer functions with predetermined key creation. In one embodiment, digital information, including a digital sample and format information, is protected by identifying and encoding a portion of the format information. Encoded digital information, including the digital sample and the encoded format information, is generated to protect the original digital information. In another embodiment, a digital signal, including digital samples in a file format having an inherent granularity, is protected by creating a predetermined key. The predetermined key is comprised of a transfer function-based mask set to manipulate data at the inherent granularity of the file format of the underlying digitized samples.

7 Claims, 1 Drawing Sheet

U.S. PATENT DOCUMENTS

| | | | |
|---|---|---|---|
| 4,896,275 A | 1/1990 | Jackson | |
| 4,908,873 A | 3/1990 | Philibert et al. | |
| 4,939,515 A | 7/1990 | Adelson | |
| 4,969,204 A | 11/1990 | Melnychuck et al. | |
| 4,972,471 A | 11/1990 | Gross et al. | |
| 4,977,594 A | 12/1990 | Shear | |
| 4,979,210 A | 12/1990 | Nagata et al. | |
| 4,980,782 A | 12/1990 | Ginkel | |
| 5,050,213 A | 9/1991 | Shear | |
| 5,073,925 A | 12/1991 | Nagata et al. | |
| 5,077,665 A | 12/1991 | Silverman et al. | |
| 5,113,437 A | 5/1992 | Best et al. | |
| 5,136,581 A | 8/1992 | Muehrcke | |
| 5,136,646 A | 8/1992 | Haber et al. | |
| 5,136,647 A | 8/1992 | Haber et al. | |
| 5,142,576 A * | 8/1992 | Nadan | 380/234 |
| 5,161,210 A | 11/1992 | Druyvesteyn et al. | |
| 5,243,423 A | 9/1993 | DeJean et al. | |
| 5,243,515 A | 9/1993 | Lee | |
| 5,287,407 A | 2/1994 | Holmes | |
| 5,319,735 A | 6/1994 | Preuss et al. | |
| 5,341,429 A | 8/1994 | Stringer et al. | |
| 5,341,477 A | 8/1994 | Pitkin et al. | |
| 5,363,448 A | 11/1994 | Koopman et al. | |
| 5,365,586 A | 11/1994 | Indeck et al. | |
| 5,369,707 A | 11/1994 | Follendore, III | |
| 5,379,345 A | 1/1995 | Greenberg | |
| 5,394,324 A | 2/1995 | Clearwater | |
| 5,398,285 A * | 3/1995 | Borgelt et al. | 713/176 |
| 5,406,627 A | 4/1995 | Thompson et al. | |
| 5,408,505 A | 4/1995 | Indeck et al. | |
| 5,410,598 A | 4/1995 | Shear | |
| 5,412,718 A | 5/1995 | Narasimhalv et al. | |
| 5,418,713 A | 5/1995 | Allen | |
| 5,428,606 A | 6/1995 | Moskowitz | |
| 5,450,490 A | 9/1995 | Jensen et al. | |
| 5,469,536 A | 11/1995 | Blank | |
| 5,471,533 A * | 11/1995 | Wang et al. | 380/51 |
| 5,478,990 A | 12/1995 | Montanari et al. | |
| 5,479,210 A | 12/1995 | Cawley et al. | |
| 5,487,168 A | 1/1996 | Geiner et al. | |
| 5,493,677 A | 2/1996 | Balogh et al. | |
| 5,497,419 A | 3/1996 | Hill | |
| 5,506,795 A | 4/1996 | Yamakawa | |
| 5,513,126 A | 4/1996 | Harkins et al. | |
| 5,513,261 A | 4/1996 | Maher | |
| 5,530,739 A | 6/1996 | Okada | |
| 5,530,751 A * | 6/1996 | Morris | 380/25 |
| 5,530,759 A | 6/1996 | Braudaway et al. | |
| 5,548,579 A | 8/1996 | Lebrun et al. | |
| 5,568,570 A | 10/1996 | Rabbani | |
| 5,579,124 A | 11/1996 | Aijala et al. | |
| 5,581,703 A | 12/1996 | Baugher et al. | |
| 5,583,488 A | 12/1996 | Sala et al. | |
| 5,598,470 A | 1/1997 | Cooper et al. | |
| 5,606,609 A | 2/1997 | Houser et al. | |
| 5,613,004 A | 3/1997 | Cooperman et al. | |
| 5,617,119 A | 4/1997 | Briggs et al. | |
| 5,625,690 A | 4/1997 | Michel et al. | |
| 5,629,980 A | 5/1997 | Stefik et al. | |
| 5,633,932 A | 5/1997 | Davis et al. | |
| 5,634,040 A | 5/1997 | Her et al. | |
| 5,636,276 A | 6/1997 | Brugger | |
| 5,636,292 A | 6/1997 | Rhoads | |
| 5,640,569 A | 6/1997 | Miller et al. | |
| 5,646,997 A | 7/1997 | Barton | |
| 5,657,461 A | 8/1997 | Harkins et al. | |
| 5,659,726 A | 8/1997 | Sandford, II et al. | |
| 5,664,018 A | 9/1997 | Leighton | |
| 5,673,316 A * | 9/1997 | Auerbach et al. | 705/51 |
| 5,677,952 A * | 10/1997 | Blakley et al. | 713/189 |
| 5,680,462 A | 10/1997 | Miller et al. | |
| 5,687,236 A | 11/1997 | Moskowitz et al. | |
| 5,689,587 A | 11/1997 | Bender et al. | |
| 5,696,828 A | 12/1997 | Koopman, Jr. | |
| 5,719,937 A | 2/1998 | Warren et al. | |
| 5,721,788 A | 2/1998 | Powell et al. | |
| 5,734,752 A | 3/1998 | Knox | |
| 5,737,416 A | 4/1998 | Cooper et al. | |
| 5,737,733 A | 4/1998 | Eller | |
| 5,740,244 A | 4/1998 | Indeck et al. | |
| 5,745,569 A | 4/1998 | Moskowitz et al. | |
| 5,748,783 A | 5/1998 | Rhoads | |
| 5,751,811 A | 5/1998 | Magnotti et al. | |
| 5,754,697 A | 5/1998 | Fu et al. | |
| 5,757,923 A | 5/1998 | Koopman, Jr. | |
| 5,765,152 A | 6/1998 | Erickson | |
| 5,768,396 A | 6/1998 | Sone | |
| 5,774,452 A | 6/1998 | Wolosewicz | |
| 5,790,677 A | 8/1998 | Fox et al. | |
| 5,799,083 A | 8/1998 | Brothers et al. | |
| 5,809,139 A | 9/1998 | Grirod et al. | |
| 5,809,160 A | 9/1998 | Powell et al. | |
| 5,828,325 A | 10/1998 | Wolosewicz et al. | |
| 5,832,119 A | 11/1998 | Rhoads | |
| 5,848,155 A | 12/1998 | Cox | |
| 5,859,920 A | 1/1999 | Daly et al. | |
| 5,870,474 A | 2/1999 | Wasilewski et al. | |
| 5,884,033 A | 3/1999 | Duvall et al. | |
| 5,889,868 A | 3/1999 | Moskowitz et al. | |
| 5,893,067 A | 4/1999 | Bender et al. | |
| 5,894,521 A | 4/1999 | Conley | |
| 5,903,721 A | 5/1999 | Sixtus | |
| 5,905,800 A | 5/1999 | Moskowitz et al. | |
| 5,905,975 A | 5/1999 | Ausubel | |
| 5,912,972 A | 6/1999 | Barton | |
| 5,915,027 A | 6/1999 | Cox et al. | |
| 5,917,915 A | 6/1999 | Hirose | |
| 5,920,900 A | 7/1999 | Poole et al. | |
| 5,930,369 A | 7/1999 | Cox et al. | |
| 5,930,377 A | 7/1999 | Powell et al. | |
| 5,940,134 A | 8/1999 | Wirtz | |
| 5,943,422 A | 8/1999 | Van Wie et al. | |
| 5,963,909 A | 10/1999 | Warren et al. | |
| 5,973,731 A | 10/1999 | Schwab | |
| 5,974,141 A | 10/1999 | Saito | |
| 5,991,426 A | 11/1999 | Cox et al. | |
| 5,999,217 A | 12/1999 | Berners-Lee | |
| 6,009,176 A | 12/1999 | Gennaro et al. | |
| 6,029,126 A | 2/2000 | Malvar | |
| 6,041,316 A * | 3/2000 | Allen | 705/52 |
| 6,044,471 A | 3/2000 | Colvin | |
| 6,049,838 A | 4/2000 | Miller et al. | |
| 6,051,029 A | 4/2000 | Paterson et al. | |
| 6,061,793 A | 5/2000 | Tewfik et al. | |
| 6,069,914 A | 5/2000 | Cox | |
| 6,078,664 A | 6/2000 | Moskowitz et al. | |
| 6,081,251 A | 6/2000 | Sakai et al. | |
| 6,081,597 A | 6/2000 | Hoffstein et al. | |
| 6,088,455 A | 7/2000 | Logan et al. | |
| 6,131,162 A | 10/2000 | Yoshiura et al. | |
| 6,141,753 A | 10/2000 | Zhao et al. | |
| 6,141,754 A | 10/2000 | Choy | |
| 6,154,571 A | 11/2000 | Cox et al. | |
| 6,199,058 B1 | 3/2001 | Wong et al. | |
| 6,205,249 B1 | 3/2001 | Moskowitz | |
| 6,208,745 B1 | 3/2001 | Florenio et al. | |
| 6,230,268 B1 | 5/2001 | Miwa et al. | |
| 6,233,347 B1 | 5/2001 | Chen et al. | |
| 6,233,684 B1 | 5/2001 | Stefik et al. | |
| 6,240,121 B1 | 5/2001 | Senoh | |
| 6,263,313 B1 | 7/2001 | Milsted et al. | |
| 6,272,634 B1 | 8/2001 | Tewfik et al. | |
| 6,275,988 B1 | 8/2001 | Nagashima et al. | |

| | | |
|---|---|---|
| 6,278,780 B1 | 8/2001 | Shimada |
| 6,278,791 B1 | 8/2001 | Honsinger et al. |
| 6,282,300 B1 | 8/2001 | Bloom et al. |
| 6,282,650 B1 | 8/2001 | Davis |
| 6,285,775 B1 | 9/2001 | Wu et al. |
| 6,301,663 B1 | 10/2001 | Kato et al. |
| 6,310,962 B1 | 10/2001 | Chung et al. |
| 6,330,335 B1 | 12/2001 | Rhoads |
| 6,330,672 B1 | 12/2001 | Shur |
| 6,345,100 B1 | 2/2002 | Levine |
| 6,351,765 B1 | 2/2002 | Pietropaolo et al. |
| 6,373,892 B1 | 4/2002 | Ichien et al. |
| 6,377,625 B1 | 4/2002 | Kim |
| 6,381,618 B1 | 4/2002 | Jones et al. |
| 6,381,747 B1 | 4/2002 | Wonfor et al. |
| 6,385,329 B1 | 5/2002 | Sharma et al. |
| 6,389,538 B1 | 5/2002 | Gruse et al. |
| 6,405,203 B1 | 6/2002 | Collart |
| 6,415,041 B1 | 7/2002 | Oami et al. |
| 6,425,081 B1 | 7/2002 | Iwamura |
| 6,430,301 B1 | 8/2002 | Petrovic |
| 6,430,302 B2 | 8/2002 | Rhoads |
| 6,442,283 B1 | 8/2002 | Tewfik et al. |
| 6,446,211 B1 | 9/2002 | Colvin |
| 6,453,252 B1 | 9/2002 | Laroche |
| 6,457,058 B1 | 9/2002 | Ullum et al. |
| 6,484,264 B1 | 11/2002 | Colvin |
| 6,493,457 B1 | 12/2002 | Quackenbush |
| 6,502,195 B1 | 12/2002 | Colvin |
| 6,522,769 B1 | 2/2003 | Rhoads et al. |
| 6,523,113 B1 | 2/2003 | Wehrenberg |
| 6,530,021 B1 | 3/2003 | Epstein et al. |
| 6,532,284 B2 | 3/2003 | Walker et al. |
| 6,539,475 B1 | 3/2003 | Cox et al. |
| 6,557,103 B1 | 4/2003 | Boncelet, Jr. et al. |
| 6,584,125 B1 | 6/2003 | Katto |
| 6,587,837 B1 | 7/2003 | Spagna et al. |
| 6,598,162 B1 | 7/2003 | Moskowitz |
| 6,606,393 B1 | 8/2003 | Xie et al. |
| 6,647,424 B1 | 11/2003 | Pearson et al. |
| 6,665,489 B2 | 12/2003 | Collart |
| 6,668,246 B1 | 12/2003 | Yeung et al. |
| 6,668,325 B1 | 12/2003 | Collberg et al. |
| 6,687,683 B1 | 2/2004 | Harada et al. |
| 6,725,372 B1 | 4/2004 | Lewis et al. |
| 6,754,822 B1 | 6/2004 | Zhao |
| 6,775,772 B1 | 8/2004 | Binding et al. |
| 6,785,815 B1 | 8/2004 | Serret-Avila et al. |
| 6,785,825 B2 | 8/2004 | Colvin |
| 6,792,548 B2 | 9/2004 | Colvin |
| 6,792,549 B2 | 9/2004 | Colvin |
| 6,795,925 B2 | 9/2004 | Colvin |
| 6,799,277 B2 | 9/2004 | Colvin |
| 6,813,717 B2 | 11/2004 | Colvin |
| 6,813,718 B2 | 11/2004 | Colvin |
| 6,823,455 B1 | 11/2004 | Macy et al. |
| 6,842,862 B2 | 1/2005 | Chow et al. |
| 6,857,078 B2 | 2/2005 | Colvin |
| 6,931,534 B1 | 8/2005 | Jandel et al. |
| 6,966,002 B1 | 11/2005 | Torrubia-Saez |
| 6,977,894 B1 | 12/2005 | Achilles et al. |
| 6,978,370 B1 | 12/2005 | Kocher |
| 6,986,063 B2 | 1/2006 | Colvin |
| 7,020,285 B1 | 3/2006 | Kirovski et al. |
| 7,043,050 B2 | 5/2006 | Yuval |
| 7,046,808 B1 | 5/2006 | Metois et al. |
| 7,050,396 B1 | 5/2006 | Cohen et al. |
| 7,051,208 B2 | 5/2006 | Venkatesan et al. |
| 7,058,570 B1 | 6/2006 | Yu et al. |
| 7,093,295 B1 | 8/2006 | Saito |
| 7,103,184 B2 | 9/2006 | Jian |
| 7,150,003 B2 | 12/2006 | Naumovich et al. |
| 7,177,430 B2 | 2/2007 | Kim |
| 7,206,649 B2 | 4/2007 | Kirovski et al. |
| 7,231,524 B2 | 6/2007 | Burns |
| 7,233,669 B2 | 6/2007 | Candelore |
| 7,240,210 B2 | 7/2007 | Michak et al. |
| 7,266,697 B2 | 9/2007 | Kirovski et al. |
| 2002/0026343 A1 | 2/2002 | Duenke |
| 2002/0097873 A1 | 7/2002 | Petrovic |
| 2002/0103883 A1 | 8/2002 | Haverstock et al. |
| 2003/0126445 A1 | 7/2003 | Wehrenberg |
| 2003/0133702 A1 | 7/2003 | Collart |
| 2004/0037449 A1 | 2/2004 | Davis et al. |
| 2004/0049695 A1 | 3/2004 | Choi et al. |
| 2004/0059918 A1 | 3/2004 | Xu |
| 2004/0083369 A1 | 4/2004 | Erlingsson et al. |
| 2004/0093521 A1 | 5/2004 | Hamadeh et al. |
| 2004/0117628 A1 | 6/2004 | Colvin |
| 2004/0117664 A1 | 6/2004 | Colvin |
| 2004/0128514 A1 | 7/2004 | Rhoads |
| 2004/0225894 A1 | 11/2004 | Colvin |
| 2005/0160271 A9 | 7/2005 | Brundage et al. |
| 2005/0246554 A1 | 11/2005 | Batson |
| 2006/0005029 A1 | 1/2006 | Petrovic et al. |
| 2006/0013395 A1 | 1/2006 | Brundage et al. |
| 2007/0083467 A1 | 4/2007 | Lindahl et al. |

FOREIGN PATENT DOCUMENTS

| | | |
|---|---|---|
| EP | 0565947 A1 | 10/1993 |
| EP | 0581317 A2 | 2/1994 |
| EP | 0649261 | 4/1995 |
| EP | 0651554 A | 5/1995 |
| NL | 100523 | 9/1998 |
| WO | WO 95/14289 | 5/1995 |
| WO | WO 96/29795 | 9/1996 |
| WO | WO 97/24833 | 7/1997 |
| WO | WO 9744736 | 11/1997 |
| WO | WO98/37513 | 8/1998 |
| WO | WO 9952271 | 10/1999 |
| WO | WO 99/62044 | 12/1999 |
| WO | WO 9963443 | 12/1999 |

OTHER PUBLICATIONS

Menezes, Alfred J., Handbook of Applied Crypography, CRC Press, p. 46, 1997.

Merriam-Webster's Collegiate Dictionary, 10th Ed., Merriam Webster, Inc., p. 207.

Brealy, et al., Principles of Corporate Finance, "Appendix A-Using Option Valuation Models", 1984, pp. 448-449.

Copeland, et al., Real Options:A Practioner's Guide, 2001 pp. 106-107, 201-202, 204-208.

Sarkar, M. "An Assessment of Pricing Mechanisms for the Internet-A Regulatory Imperative", presented MIT Workshop on Internet Economics, Mar. 1995, http://www.press.vmich.edu/ien/works/SarkAsses.html on.

Crawford, D.W. "Pricing Network Usage:A Market for Bandwith of Market Communication?" presented MIT Workshop on Internet Economics, Mar. 1995 http://www.press.vmich.edu/iep/works/CrawMarket.html. on March.

Low, S.H., "Equilibrium Allocation and Pricing of Variable Resources Among User-Suppliers", 1988. http://www.citesear.nj.nec.com/366503.html.

Caronni, Germano, "Assuring Ownership Rights for Digital Images", published proceeds of reliable IT systems, v15 '95, H.H. Bruggemann and W Gerhardt-Hackel (Ed) Viewing Publishing Company Germany 1995.

Zhao, Jian. "A WWW Service to Embed and Prove Digital Copyright Watermarks", Proc. of the european conf. on Mulitmedia Applications, Services & Techniques Louvain-La-Nevve Belgium May 1996.

Gruhl,Daniel et al.,Echo Hiding. In Proceeding of the Workshop on Information Hiding. No. 1174 in Lecture Notes in Computer Science, Cambridge, England (May/Jun. 1996).

Oomen, A.W.J. et al., A Variable Bit Rate Buried Data Channel for Compact Disc, J.Audio Eng.Sc.,vol. 43,No. 1/2,pp. 23-28 (1995).

Ten Kate,W. et al., A New Surround-Stereo-Surround Coding Techniques, J. Audio Eng.Soc.,vol. 40,No. 5,pp. 376-383 (1992).

Gerzon, Michael et al., A High Rate Buried Data Channel for Audio CD, presentation notes, Audio Engineering Soc. 94th Convention (1993).

Sklar,Bernard, Digital Communications, pp. 601-603 (1988).

Jayant, N.S. et al., Digital Coding of Waveforms, Prentice Hall Inc., Englewood Cliffs,NJ, pp. 486-509 (1984).

Bender, Walter R. et al., Techniques for Data Hiding, SPIE Int. Soc. Opt. Eng., vol. 2420, pp. 164-173, 1995.

Zhao, Jian et al., Embedding Robust Labels into Images for Copyright Protection, (xp 000571976), pp. 242-251, 1995.

Menezes, Alfred J., Handbook of Applied Cryptography, CRC Press, p. 175, 1997.

Schneier, Bruce, Applied Cryptography, 1st Ed., pp. 67-68, 1994.

Ten Kate, W. et al., "Digital Audio Carrying Extra Information", IEEE, CH 2847-2/90/0000-1097, (1990).

van Schyndel, et al. A digital Watermark, IEEE Int'l Computer Processing Conference, Austin,TX, Nov 13-16, 1994, pp. 86-90.

Smith, et al. Modulation and Information Hiding in Images, Springer Verlag, 1st Int'l Workshop, Cambridge, UK, May 30-Jun. 1,1996, pp. 207-227.

Kutter, Martin et al., Digital Signature of Color Images Using Amplitude Modulation, SPIE-E197, vol. 3022, pp. 518-527.

Puate, Joan et al., Using Fractal Compression Scheme to Embed a Digital Signature into an Image, SPIE-96 Proceedings, vol. 2915, Mar. 1997, pp. 108-118.

Swanson, Mitchell D.,et al., Transparent Robust Image Watermarking, Proc. of the 1996 IEEE Int'l Conf. on Image Processing, vol. 111, 1996, pp. 211-214.

Swanson, Mitchell D., et al. Robust Data Hiding for Images, 7th IEEE Digital Signal Processing Workshop, Leon, Norway. Sep. 1-4, 1996, pp. 37-40.

Zhao, Jian et al., Embedding Robust Labels into Images for Copyright Protection, Proceeding of the Know Right '95 Conference, pp. 242-251.

Koch, E., et al., Towards Robust and Hidden Image Copyright Labeling, 1995 IEEE Workshop on Nonlinear Signal and Image Processing, Jun. 1995 Neos Marmaras pp. 4.

Van Schyandel, et al. Towards a Robust Digital Watermark, Second Asain Image Processing Conference, Dec. 6-8, 1995,Singapore, vol. 2,pp. 504-508.

Tirkel,A.Z., A Two-Dimensional Digital Watermark, DICTA '95, Univ. of Queensland, Brisbane, Dec. 5-8, 1995, pp. 7.

Tirkel,A.Z., Image Watermarking—A Spread Spectrum Application, ISSSTA '96, Sep. 1996, Mainz, German, pp. 6.

O'Ruanaidh, et al. Watermarking Digital Images for Copyright Protection, IEEE Proceedings, vol. 143, No. 4, Aug. 1996, pp. 250-256.

Cox, et al., Secure Spread Spectrum Watermarking for Multimedia, NEC Research Institute, Techinal Report 95-10, pp. 33.

Kahn, D., The Code Breakers, The MacMillan Company, 1969, pp. xIII, 81-83,513,515,522-526,863.

Boney, et al., Digital Watermarks for Audio Signals, EVSIPCO, 96, pp. 473-480.

Dept. of Electrical Engineering, Del Ft University of Technology, Del ft The Netherlands,Cr.C. Langelaar et al.,Copy Protection for Mulitmedia Data based on Labeling Techniques Jul. 1996 9 pp.

F. Hartung, et al., Digital Watermarking of Raw and Compressed Video, SPIE vol. 2952, pp. 205-213.

Craver, et al., Can Invisible Watermarks Resolve Rightful Ownerships? IBM Research Report, RC 20509 (Jul. 25, 1996) 21 pp.

Press, et al., Numerical Recipes In C, Cambridge Univ. Press, 1988, pp. 398-417.

Pohlmann, Ken C., Principles of Digital Audio, 3rd Ed., 1995, pp. 32-37, 40-48,138,147-149,332,333,364, 499-501,508-509,564-571.

Pohlmann, Ken C., Principles of Digital Audio, 2nd Ed., 1991, pp. 1-9,19-25,30-33,41-48,54-57,86-107,375-387.

Schneier, Bruce, Applied Cryptography, John Wiley & Sons, inc. , New York, 1994, pp. 68,69,387-392,1-57,273-275,321-324.

Boney, et al., Digital Watermarks for Audio Signals, Proceedings of the International Conf. on Multimedia Computing and Systems, Jun. 17-23, 1996,Hiroshima. Japan 0-8186-7436-9196. pp. 473-480.

Johnson, et al., Transform Permuted Watermarking for Copyright Protection of Digital Video, IEEE Globecom 1998, Nov. 8-12, 1998, New York, New York, vol. 2, 1998, pp. 684-689 (ISBN 0-7803-4985-7).

Rivest, et al., "Pay Word and Micromint: Two Simple Micropayment Schemes, "MIT Laboratory for Computer Science, Cambridge, MA, May 7, 1996 pp. 1-18.

Bender, et al., Techniques for Data Hiding, IBM Systems Journal, vol. 35, Nos. 3 & 4,1996,pp. 313-336.

Moskowitz, Bandwith as Currency, IEEE Multimedia, Jan.-Mar. 2003, pp. 14-21.

Moskowitz, Multimedia Security Technologies for Digital Rights Management, 2006, Academic Press, "Introduction-Digital Rights Management" pp. 3-22.

Tomsich, et al., "Towards a secure and de-centralized digital watermarking infrastructure for the protection of Intellectual Property", in Electronic Commerce and Web Technologies. Proceedings (ECWEB.

Moskowitz, "What is Acceptable Quality in the Application of Digital Watermarking: Trade-offs of Security, Robustness and Quality", IEEE Computer Society Proceedings of ITCC2002 Apr. 10, 2002 pp. 80-84.

Lemma, et al. "Secure Watermark Embedding through Partial Encryption", International Workshop on Digital Watermarking ("IWDW" 2006). Springer Lecture Notes in Computer Science,2006. (to appear) 13.

Kocher, et al., "Self Protecting Digital Content", Technical Report from the CRI Content Security Research Initiative, Crytography Research, Inc. 2002-2003. 14 pages.

Sirbu, M. et al., "Net Bill: An Internet Commerce System Optimized for Network Delivered Services", Digest of Papers of the Computer Society Computer Conference (Spring), Mar. 5, 1995, pp. 20-25, vol. CONF40.

Schunter, M. et al., "A Status Report on the SEMPER framework for Secure Electronic Commerce", Computer Networks and ISDN Systems, Sep. 30, 1998 pp. 1501-1510 vol. 30 No. 16-18 NL, North Holland.

Konrad, K. et al., "Trust and Elecronic Commerce-more than a techinal problem," Proceedings of the 18th IEEE Symposium on Reliable Distributed Systems Oct. 19-22, 1999 pp. 360-365 Lausanne.

Kini, a. et al., "Trust in Electronic Commerce: Definition and Theoretical Considerations", Proceedings of the 31st Hawaii Int'l Conf on System Sciences (Cat. No. 98TB100216). Jan. 6-9, 1998, pp. 51-61, Los.

Steinauer D. D., et al., "Trust and Traceability in Electronic Commerce", Standard View, Sep. 1997, pp. 118-124, vol. 5 No. 3, ACM, USA.

Hartung, et al. "Multimedia Watermarking Techniques", Proceedings of the IEEE, Special Issue, Identification & Protection of Multimedia Information, pp. 1079-1107, Jul. 1999, vol. 87 No. 7 IEEE.

Rivest,et al., PayWord and MicroMint: Two simple micropayment schemes, MIT Laboratory for Computer Science, Cambridge, MA 02139, Apr. 27, 2001, pp. 1-18.

Horowitz, et al., The Art of Electronics, 2nd Ed., 1989, pp. 7.

Delaigle, J.-F., et al. "Digital Watermarking," Proceedings of the SPIE, vol. 2659, Feb 1, 1996, pp. 99-110 (Abstract).

Schneider, M., et al. "Robust Content Based Digital Signature for Image Authentication," Proceedings of the International Conference on Image Processing (IC, Lausanne). Sep. 16-19, 1996, pp. 227-230, IEEE ISBN.

Cox, I. J., et al. "Secure Spread Spectrum Watermarking for Multimedia," IEEE Transactions on Image Processing, vol. 6 No. 12, Dec. 1, 1997, pp. 1673-1686.

Wong, Ping Wah. "A Public Key Watermark for Image Verification and Authentication," IEEE International Conference on Image Processing, vol. 1, Oct. 4-7, 1998, pp. 455-459.

Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN: 3-540-65386-4.

Ross Anderson, "Stretching the Limits of Steganography," LNCS, vol. 1174, May/Jun. 1996, 10 pages, ISBN: 3-540-61996-8.

Joseph J.K. O'Ruanaidh and Thierry Pun, "Rotation, Scale and Translation Invariant Digital Image Watermarking", pre-publication, Summer 1997, 4 pages.

Joseph J.K. O'Ruanaidh and Thierry Pun, "Rotation, Scale and Translation Invariant Digital Image Watermarking", Submitted to Signal Processing Aug. 21, 1997, 19 pages.

Rivest, R.,"Chaffing and Winnowing: Confidentiality without Encryption", MIT Lab for Computer Science, http://people.csail.mit.edu/rivest/Chaffing.txt, Apr. 24, 1998, 9 pages.

PortalPlayer, PP5002 digital media management system-on-chip, May 1, 2003, 4 pages.

VeriDisc, "The Search for a Rational Solution to Digital Rights Management (DRM)", http://64.244.235.240/news/whitepaper/docs/veridisc_white_paper.pdf, 2001,15 pages.

Cayre, et al., "Kerckhoffs-Based Embedding Security Classes for WOA Data Hiding", IEEE Transactions on Information Forensics and Security, vol. 3 No. 1, Mar. 2008, 15 pages.

Staind (The Singles 1996-2006), Warner Music—Atlantic, Pre-Release CD image, 2003, 1 page.

Arctic Monkeys (Whatever People Say I Am, That's What I'm Not), Domino Recording Co. Ltd., Pre-Release CD image, 2005, 1 page.

Radiohead ("Hail To The Thief"), EMI Music Group—Capitol, Pre-Release CD image, 2003, 1 page.

PCT International Search Report, completed Sep. 13, 1995; authorized officer Huy D. Vu (PCT/US95/08159) (2 pages).

PCT International Search Report, completed Jun. 11, 1996; authorized officer Salvatore Cangialosi (PCT/US96/10257) (4 pages).

Supplementary European Search Report, completed Mar. 5, 2004; authorized officer J. Hazel (EP 96 91 9405) (1 page).

PCT International Search Report, completed Apr. 4, 1997; authorized officer Bernarr Earl Gregory (PCT/US97/00651) (1 page).

PCT International Search Report, completed May 6, 1997; authorized officer Salvatore Cangialosi (PCT/US97/00652) (3 pages).

PCT International Search Report, completed Oct. 23, 1997; authorized officer David Cain (PCT/US97/11455) (1 page).

PCT International Search Report, completed Jul. 12, 1999; authorized officer R. Hubeau (PCT/US99/07262) (3 pages).

PCT International Search Report, completed Jun. 30, 2000; authorized officer Paul E. Callahan (PCT/US00/06522) (7 pages).

Supplementary European Search Report, completed Jun. 27, 2002; authorized officer M. Schoeyer (EP 00 91 9398) (1 page).

PCT International Search Report, date of mailing Mar. 15, 2001; authorized officer Marja Brouwers (PCT/US00/18411) (5 pages).

PCT International Search Report, completed Jul. 20, 2001; authorized officer A. Sigolo (PCT/US00/18411) (5 pages).

PCT International Search Report, completed Mar. 20, 2001; authorized officer P. Corcoran (PCT/US00/33126) (6 pages).

PCT International Search Report, completed Jan. 26, 2001; authorized officer A. Sigolo (PCT/US00/21189) (3 pages).

European Search Report, completed Oct. 15, 2007; authorized officer James Hazel (EP 07 11 2420) (9 pages).

* cited by examiner though U.S. Pat. No.

METHOD FOR COMBINING TRANSFER FUNCTIONS WITH PREDETERMINED KEY CREATION

CROSS-REFERENCE TO RELATED APPLICATIONS

This application is a continuation application of U.S. patent application Ser. No. 09/046,627 (now awaiting issuance), which is a continuation of U.S. patent application Ser. No. 08/587,943, filed Jan. 17, 1996, (which issued Apr. 28, 1998, as U.S. Pat. No. 5,745,943). The entire disclosure of U.S. patent application Ser. No. 09/046,627 is hereby incorporated by reference.

FIELD OF THE INVENTION

The invention relates to the protection of digital information. More particularly, the invention relates to a method for combining transfer functions with predetermined key creation.

BACKGROUND OF THE INVENTION

Increasingly, commercially valuable information is being created and stored in "digital" form. For example, music, photographs and video can all be stored and transmitted as a series of numbers, such as 1's and 0's. Digital techniques let the original information be recreated in a very accurate manner. Unfortunately, digital techniques also let the information be easily copied without the information owner's permission.

Because unauthorized copying is clearly a disincentive to the digital distribution of valuable information, it is important to establish responsibility for copies and derivative copies of such works. For example, if each authorized digital copy of a popular song is identified with a unique number, any unauthorized copy of the song would also contain the number. This would allow the owner of the information, such as a song publisher, to investigate who made the unauthorized copy. Unfortunately, it is possible that the unique number could be erased or altered if it is simply tacked on at the beginning or end of the digital information.

As will be described, known digital "watermark" techniques give creators and publishers of digitized multimedia content localized, secured identification and authentication of that content. In considering the various forms of multimedia content, such as "master," stereo, National Television Standards Committee (NTSC) video, audio tape or compact disc, tolerance of quality will vary with individuals and affect the underlying commercial and aesthetic value of the content. For example, if a digital version of a popular song sounds distorted, it will be less valuable to users. It is therefore desirable to embed copyright, ownership or purchaser information, or some combination of these and related data, into the content in a way that will damage the content if the watermark is removed without authorization.

To achieve these goals, digital watermark systems insert ownership information in a way that causes little or no noticeable effects, or "artifacts," in the underlying content signal. For example, if a digital watermark is inserted into a digital version of a song, it is important that a listener not be bothered by the slight changes introduced by the watermark. It is also important for the watermark technique to maximize the encoding level and "location sensitivity" in the signal to force damage to the content signal when removal is attempted. Digital watermarks address many of these concerns, and research in the field has provided extremely robust and secure implementations.

What has been overlooked in many applications described in the art, however, are systems which closely mimic distribution of content as it occurs in the real world. For instance, many watermarking systems require the original un-watermarked content signal to enable detection or decode operations. These include highly publicized efforts by NEC, Digimarc and others. Such techniques are problematic because, in the real world, original master copies reside in a rights holders vaults and are not readily available to the public.

With much activity overly focused on watermark survivability, the security of a digital watermark is suspect. Any simple linear operation for encoding information into a signal may be used to erase the embedded signal by inverting the process. This is not a difficult task, especially when detection software is a plug-in freely available to the public, such as with Digimarc. In general, these systems seek to embed cryptographic information, not cryptographically embed information into target media content.

Other methods embed ownership information that is plainly visible in the media signal, such as the method described in U.S. Pat. No. 5,530,739 to Braudaway et al. The system described in Braudaway protects a digitized image by encoding a visible watermark to deter piracy. Such an implementation creates an immediate weakness in securing the embedded information because the watermark is plainly visible. Thus, no search for the embedded signal is necessary and the watermark can be more easily removed or altered. For example, while certainly useful to some rights owners, simply placing the symbol "©" in the digital information would only provide limited protection. Removal by adjusting the brightness of the pixels forming the "©" would not be difficult with respect to the computational resources required.

Other relevant prior art includes U.S. Pat. No. 4,979,210 and 5,073,925 to Nagata et al., which encodes information by modulating an audio signal in the amplitude/time domain. The modulations introduced in the Nagata process carry a "copy/don't copy" message, which is easily found and circumvented by one skilled in the art. The granularity of encoding is fixed by the amplitude and frequency modulation limits required to maintain inaudibility. These limits are relatively low, making it impractical to encode more information using the Nagata process.

Although U.S. Pat. No. to prevent collusion attacks in digital watermarks, the disclosed method may not actually provide the security described. For-example, in cases where the watermarking technique is linear, the "insertion envelope" or "watermarking space" is well-defined and thus susceptible to attacks less sophisticated than collusion by unauthorized parties. Over-encoding at the watermarking encoding level is but one simple attack in such linear implementations. Another consideration not made by Leighton is that commercially-valuable content may already exist in a un-watermarked form somewhere, easily accessible to potential pirates, gutting the need for any type of collusive activity. Digitally signing the embedded signal with preprocessing of watermark data is more likely to prevent successful collusion. Furthermore, a "baseline" watermark as disclosed is quite subjective. It is simply described elsewhere in the art as the "perceptually significant" regions of a signal. Making a watermarking function less linear or inverting the insertion of watermarks would seem to provide the same benefit without the additional work required to create a "baseline" watermark. Indeed, watermarking algorithms should already be capable of defining a target insertion envelope or region without additional steps. What is evident is the Leighton patent does not allow for initial prevention of attacks on an embedded watermark as the content is visibly or audibly unchanged.

It is also important that any method for providing security also function with broadcasting media over networks such as the Internet, which is also referred to as "streaming." Commercial "plug-in" products such as RealAudio and RealVideo, as well as applications by vendors VDONet and Xtreme, are common in such network environments. Most digital watermark implementations focus on common file base signals and fail to anticipate the security of streamed signals. It is desirable that any protection scheme be able to function with a plug-in player without advanced knowledge of the encoded media stream.

Other technologies focus solely on file-based security. These technologies illustrate the varying applications for security that must be evaluated for different media and distribution environments. Use of cryptolopes or cryptographic containers, as proposed by IBM in its Cryptolope product, and InterTrust, as described in U.S. Pat. Nos. 4,827,508, 4,977,594, 5,050,213 and 5,410,598, may discourage certain forms of piracy. Cryptographic containers, however, require a user to subscribe to particular decryption software to decrypt data. IBM's InfoMarket and InterTrust's DigiBox, among other implementations, provide a generalized model and need proprietary architecture to function. Every user must have a subscription or registration with the party which encrypts the data. Again, as a form of general encryption, the data is scrambled or encrypted without regard to the media and its formatting. Finally, control over copyrights or other neighboring rights is left with the implementing party, in this case, IBM, InterTrust or a similar provider.

Methods similar to these "trusted systems" exist, and Cerberus Central Limited and Liquid Audio, among a number of companies, offer systems which may functionally be thought of as subsets of IBM and InterTrust's more generalized security offerings. Both Cerberus and Liquid Audio propose proprietary player software which is registered to the user and "locked" in a manner parallel to the locking of content that is distributed via a cryptographic container. The economic trade-off in this model is that users are required to use each respective companies' proprietary player to play or otherwise manipulate content that is downloaded. If, as is the case presently, most music or other media is not available via these proprietary players and more companies propose non-compatible player formats, the proliferation of players will continue. Cerberus and Liquid Audio also by way of extension of their architectures provide for "near-CD quality" but proprietary compression. This requirement stems from the necessity not to allow content that has near-identical data make-up to an existing consumer electronic standard, in Cerberus and Liquid Audio's case the so-called Red Book audio CD standard of 16 bit 44.1 kHz, so that comparisons with the proprietary file may not yield how the player is secured. Knowledge of the player's file format renders its security ineffective as a file may be replicated and played on any common player, not the intended proprietary player of the provider of previously secured and uniquely formatted content. This is the parallel weakness to public key crypto-systems which have gutted security if enough plain text and cipher text comparisons enable a pirate to determine the user's private key.

Many approaches to digital watermarking leave detection and decoding control with the implementing party of the digital watermark, not the creator of the work to be protected. A set of secure digital watermark implementations address this fundamental control issue forming the basis of key-based approaches. These are covered by the following patents and pending applications, the entire disclosures of which are hereby incorporated by reference: U.S. Pat. No. 5,613,004 entitled "Steganographic Method and Device" and its derivative U.S. patent application Ser. No. 08/775,216 (issued as U.S. Pat. No. 5,687,236 on Nov. 11, 1997), U.S. patent application Ser. No. 08/587,944 entitled "Human Assisted Random Key Generation and Application for Digital Watermark System," (issued as U.S. Pat. No. 5,822,432 on Oct. 13, 1998) U.S. patent application Ser. No. 08/587,943 entitled "Method for Stega-Cipher Protection of Computer Code," (issued as U.S. Pat. No. 5,745,569 on Apr. 28, 1998) U.S. patent application Ser. No. 08/677,435 entitled "Optimization Methods for the Insertion, Protection, and Detection of Digital Watermarks in Digitized Data," (issued as U.S. Pat. No. 5,889,868 on Jul. 2, 1996) and U.S. patent application Ser. No. 08/772,222 entitled "Z-Transform Implementation of Digital Watermarks" (issued as U.S. Pat. No. 6,078,664 on Jun. 20, 2000) Public key crypto-systems are described in U.S. Pat. No. 4,200,770, 4,218,582, 4,405,829 and 4,424,414, the entire disclosures of which are also hereby incorporated by reference.

In particular, an improved protection scheme is described in "Method for Stega-Cipher Protection of Computer Code," U.S. patent application Ser. No. 08/587,943 (issued as U.S. Pat. No. 5,745,569 on Apr. 28, 1998). This technique uses the key-based insertion of binary executable computer code within a content signal that is subsequently, and necessarily, used to play or otherwise manipulate the signal in which it is encoded. With this system, however, certain computational requirements, such as one digital player per digital copy of content, may be necessitated. For instance, a consumer may download many copies of watermarked content. With this technique, the user would also be downloading as many copies of the digital player program. While this form of security may be desirable for some applications, it is not appropriate in many circumstances.

Finally, even when digital information is distributed in encoded form, it may be desirable to allow unauthorized users to play the information with a digital player, perhaps with a reduced level of quality. For example, a popular song may be encoded and freely distributed in encoded form to the public. The public, perhaps using commonly available plug-in digital players, could play the encoded content and hear the music in some degraded form. The music may-sound choppy, or fuzzy or be degraded in some other way. This lets the public decide, based on the available lower quality version of the song, if they want to purchase a key from the publisher to decode, or "clean-up," the content. Similar approaches could be used to distribute blurry pictures or low quality video. Or even "degraded" text, in the sense that only authenticated portions of the text can be determined with the predetermined key or a validated digital signature for the intended message.

In view of the foregoing, it can be appreciated that a substantial need exists for a method allowing encoded content to be played, with degraded quality, by a plug-in digital player, and solving the other problems discussed above.

SUMMARY OF THE INVENTION

The disadvantages of the art are alleviated to a great extent by a method for combining transfer functions with predetermined key creation. In one embodiment, digital information, including a digital sample and format information, is protected by identifying and encoding a portion of the format information. Encoded digital information, including the digital sample and the encoded format information, is generated to protect the original digital information.

In another embodiment, a digital signal, including digital samples in a file format having an inherent granularity, is protected by creating a predetermined key. The predetermined key is comprised of a transfer function-based mask set to manipulate data at the inherent granularity of the file format of the underlying digitized samples.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
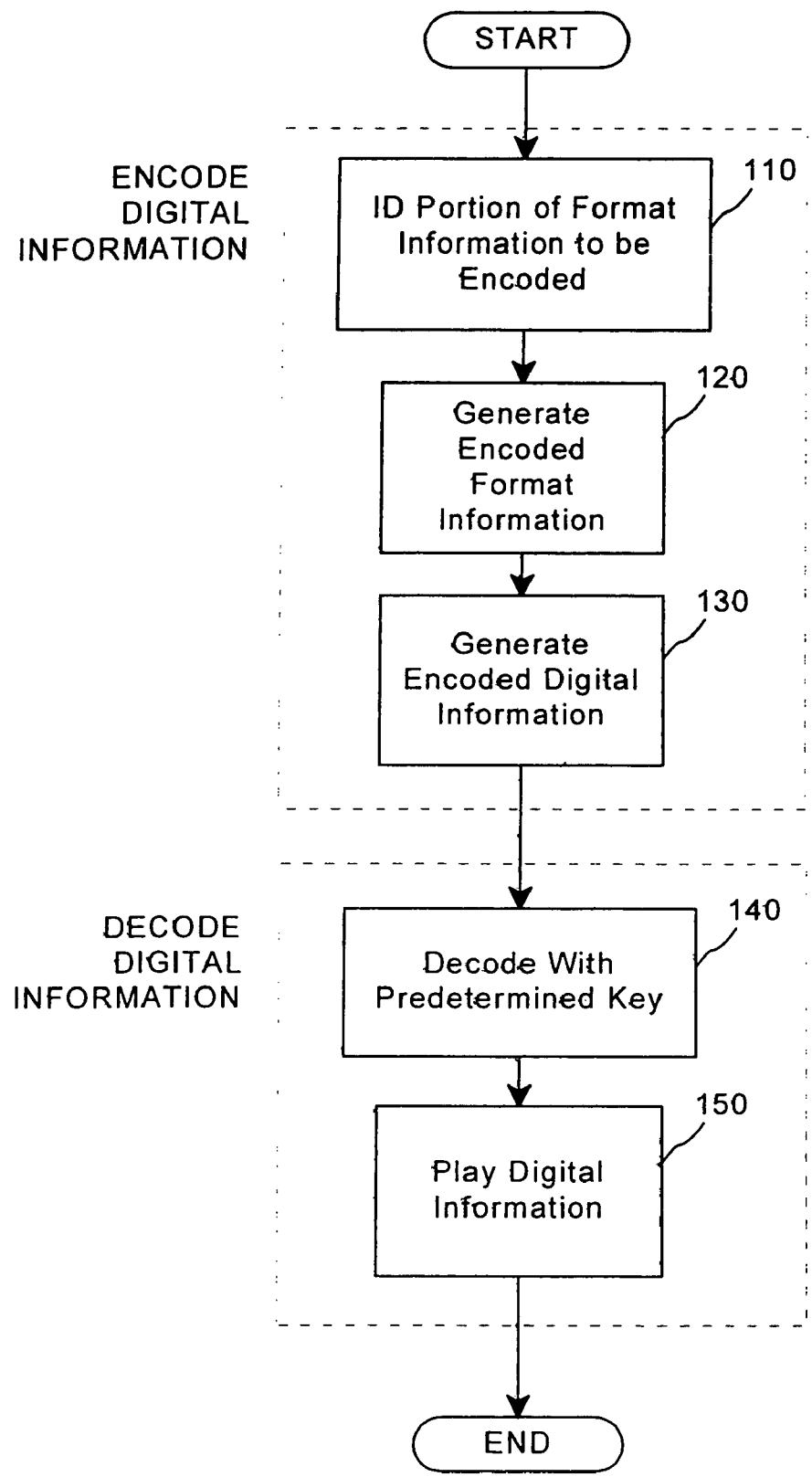
FIG. 1 is a block flow diagram of a method for copy protection or authentication of digital information according to an embodiment of the present invention.

In accordance with an embodiment of the present invention, a method combines transfer functions with predetermined key creation. Increased security is achieved in the method by combining elements of "public-key steganography" with cryptographic protocols, which keep in-transit data secure by scrambling the data with "keys" in a manner that is not apparent to those with access to the content to be distributed. Because different forms of randomness are combined to offer robust, distributed security, the present invention addresses an architectural "gray space" between two important areas of security: digital watermarks, a subset of the more general art of steganography, and cryptography. One form of randomness exists in the mask sets that are randomly created to map watermark data into an otherwise unrelated digital signal. The second form of randomness is the random permutations of data formats used with digital players to manipulate the content with the predetermined keys. These forms can be thought of as the transfer function versus the mapping function inherent to digital watermarking processes.

According to an embodiment of the present invention, a predetermined, or randomly generated, key is used to scramble digital information in a way that is unlike known "digital watermark" techniques and public key crypto-systems. As used herein, a key is also referred to as a "mask set" which includes one or more random or pseudo-random series of bits. Prior to encoding, a mask can be generated by any cryptographically secure random generation process. A block cipher, such as a Data Encryption Standard (DES) algorithm, in combination with a sufficiently random seed value, such as one created using a Message Digest 5 (MD5) algorithm, emulates a cryptographically secure random bit generator. The keys are saved in a database, along with information matching them to the digital signal, for use in descrambling and subsequent viewing or playback. Additional file format or transfer property information is prepared and made available to the encoder, in a bit addressable manner. As well, any authenticating function can be combined, such as Digital Signature Standard (DSS) or Secure Hash Algorithm (SHA).

Using the predetermined key comprised of a transfer function-based mask set, the data representing the original content is manipulated at the inherent granularity of the file format of the underlying digitized samples. Instead of providing, or otherwise distributing, watermarked content that is not noticeably altered, a partially "scrambled" copy of the content is distributed. The key is necessary both to register the sought-after content and to descramble the content into its original form.

The present invention uses methods disclosed in "Method for Stega-Cipher Protection of Computer Code," U.S. patent application Ser. No. 08/587,943 (issued as U.S. Pat. No. 5,745,569 on Apr. 28, 1998), with respect to transfer functions related to the common file formats, such as PICT, TIFF, AIFF, WAV, etc. Additionally, in cases where the content has not been altered beyond being encoded with such functional data, it is possible for a digital player to still play the content because the file format has not been altered. Thus, the encoded content could still be played by a plug-in digital player as discrete, digitally sampled signals, watermarked or not. That is, the structure of the file can remain basically unchanged by the watermarking process, letting common file format based players work with the "scrambled" content.

For example, the Compact Disc-Digital Audio (CD-DA) format stores audio information as a series of frames. Each frame contains a number of digital samples representing, for example, music, and a header that contains file format information. As shown in FIG. 1, according to an embodiment of the present invention some of the header information can be identified and "scrambled" using the predetermined key at steps 110 to 130. The music samples can remain unchanged. Using this technique, a traditional CD-DA player will be able to play a distorted version of the music in the sample. The amount of distortion will depend on the way, and extent, that the header, or file format, information has been scrambled. It would also be possible to instead scramble some of the digital samples while leaving the header information alone. In general, the digital signal would be protected by manipulating data at the inherent granularity, or "frames," of the CD-DA file format. To decode the information, a predetermined key is used before playing the digital information at steps 140 and 150.

A key-based decoder can act as a "plug-in" digital player of broadcast signal streams without foreknowledge of the encoded media stream. Moreover, the data format orientation is used to partially scramble data in transit to prevent unauthorized descrambled access by decoders that lack authorized keys. A distributed key can be used to unscramble the scrambled content because a decoder would understand how to process the key. Similar to on-the-fly decryption operations, the benefits inherent in this embodiment include the fact that the combination of watermarked content security, which is key-based, and the descrambling of the data, can be performed by the same key which can be a plurality of mask sets. The mask sets may include primary, convolution and message delimiter masks with file format data included.

The creation of an optimized "envelope" for insertion of watermarks provides the basis of much watermark security, but is also a complementary goal of the present invention. The predetermined or random key that is generated is not only an essential map to access the hidden information signal, but is also the descrambler of the previously scrambled signal's format for playback or viewing.

In a system requiring keys for watermarking content and validating the distribution of the content, different keys may be used to encode different information while secure one way hash functions or one-time pads may be incorporated to secure the embedded signal. The same keys can be used to later validate the embedded digital signature, or even fully decode the digital watermark if desired. Publishers can easily stipulate that content not only be digitally watermarked but that distributors must check the validity of the watermarks by performing digital signature-checks with keys that lack any other functionality. The system can extend to simple authentication of text in other embodiments.

Before such a market is economically feasible, there are other methods for deploying key-based watermarking coupled with transfer functions to partially scramble the content to be distributed without performing full public key encryption, i.e., a key pair is not necessarily generated, simply, a predetermined key's function is created to re-map the data of the content file in a lossless process. Moreover, the scrambling performed by the present invention may be more dependent on the file in question. Dissimilarly, encryption is not specific to any particular media but is performed on data. The file format remains unchanged, rendering the file useable by any conventional viewer/player, but the signal quality can be intentionally degraded in the absence of the proper player and key. Public-key encryption seeks to completely obscure the sensitive "plaintext" to prevent comparisons with the "ciphertext" to determine a user's private keys. Centralized encryption only differs in the utilization of a single key for both encryption and decryption making the key even more highly vulnerable to attacks to defeat the encryption process. With the present invention, a highly sought after photograph may be hazy to the viewer using any number of commonly available, nonproprietary software or hardware, without the authorized key. Similarly, a commercially valuable song may sound poor.

The benefit of some form of cryptography is not lost in the present invention. In fact, some piracy can be deterred when the target signal may be known but is clearly being protected through scrambling. What is not anticipated by known techniques, is an ala carte method to change various aspects of file formatting to enable various "scrambled states" for content to be subsequently distributed. An image may lack all red pixels or may not have any of the most significant bits activated. An audio sample can similarly be scrambled to render it less-than-commercially viable.

The present invention also provides improvements over known network-based methods, such as those used for the streaming of media data over the Internet. By manipulating file formats, the broadcast media, which has been altered to "fit" within electronic distribution parameters, such as bandwidth availability and error correction considerations, can be more effectively utilized to restrict the subsequent use of the content while in transit as well as real-time viewing or playing.

The mask set providing the transfer function can be read on a per-use basis by issuing an authorized or authenticating "key" for descrambling the signal that is apparent to a viewer or a player or possessor of the authenticating key. The mask set can be read on a per-computer basis by issuing the authorized key that is more generalized for the computer that receives the broadcast signals. Metering and subscription models become viable advantages over known digital watermark systems which assist in designating the ownership of a copy of digitized media content, but do not prevent or restrict the copying or manipulation of the sampled signal in question. For broadcast or streamed media, this is especially the case. Message authentication is also possible, though not guaranteeing the same security as an encrypted file as with general crypto systems.

The present invention thus benefits from the proprietary player model without relying on proprietary players. No new players will be necessary and existing multimedia file formats can be altered to exact a measure of security which is further increased when coupled with digital watermarks. As with most consumer markets for media content, predominant file formats exist, de facto, and corresponding formats for computers likewise exist. For a commercial compact disc quality audio recording, or 16 bit 44.1 kHz, corresponding file formats include: Audio Interchange File Format (AIFF), Microsoft WAV, Sound Designer II, Sun's .au, Apple's Quicktime, etc. For still image media, formats are similarly abundant: TIFF, PICT, JPEG, GIF, etc. Requiring the use of additional proprietary players, and their complementary file formats, for limited benefits in security is wasteful. Moreover, almost all computers today are multimedia-capable, and this is increasingly so with the popularity of Intel's MMX chip architecture and the PowerPC line of microchips. Because file formatting is fundamental in the playback of the underlying data, the predetermined key can act both as a map, for information to be encoded as watermark data regarding ownership, and a descrambler of the file that has been distributed. Limitations will only exist in how large the key must be retrofitted for a given application, but any manipulation of file format information is not likely to exceed the size of data required versus that for an entire proprietary player.

As with previous disclosures by the inventor on digital watermarking techniques, the present invention may be implemented with a variety of cryptographic protocols to increase both confidence and security in the underlying system. A predetermined key is described as a set of masks. These masks may include primary, convolution and message delimiter mask. In previous disclosures, the functionality of these masks is defined solely for mapping. The present invention includes a mask set which is also controlled by the distributing party of a copy of a given media signal. This mask set is a transfer function which is limited only by the parameters of the file format in question. To increase the uniqueness or security of each key used to scramble a given media file copy, a secure one way hash function can be used subsequent to transfer properties that are initiated to prevent the forging of a particular key. Public and private keys may be used as key pairs to further increase the unlikeliness that a key may be compromised.

These same cryptographic protocols can be combined with the embodiments of the present invention in administering streamed content that requires authorized keys to correctly display or play the streamed content in an unscrambled manner. As with digital watermarking, symmetric or asymmetric public key pairs may be used in a variety of implementations. Additionally, the need for certification authorities to maintain authentic key-pairs becomes a consideration for greater security beyond symmetric key implementations. The cryptographic protocols makes possible, as well, a message of text to be authenticated by a message authenticating function in a general computing device that is able to ensure secure message exchanges between authorizing parties.

Although various embodiments are specifically illustrated and described herein, it will be appreciated that modifications and variations of the present invention are covered by the above teachings and within the purview of the appended claims without departing from the spirit and intended scope of the invention.

What is claimed is:

1. A method for protecting a digital signal, comprising the steps of:
providing a digital signal comprising digital data and file format information defining how the digital signal is encoded;
creating a predetermined key to manipulate the digital signal wherein the predetermined key comprises a plurality of mask sets; and manipulating the digital signal using the predetermined key to generate at least one permutation of the digital signal parameterized by the file format information defining how the digital signal is encoded.

2. A method for protecting a digital signal, comprising the steps of:

providing a digital signal comprising digital data and file format information defining how the digital signal is encoded;

creating a predetermined key to manipulate the digital signal wherein the predetermined key comprises a key pair comprising a public key and a private key; and manipulating the digital signal using the predetermined key to generate at least one permutation of the digital signal parameterized by the file format information defining how the digital signal is encoded.

3. A method for protecting a digital signal, comprising the steps of:

providing a digital signal comprising digital data and file format information defining how the digital signal is encoded;

creating a predetermined key to manipulate the digital signal wherein the predetermined key comprises one or more mask sets having random or pseudo-random series of bits, the method further comprising the steps of:

generating a hash value using the one or more masks sets; and authenticating the one or more mask sets by comparing the generated hash value with a predetermined hash value; and manipulating the digital signal using the predetermined key to generate at least one permutation of the digital signal parameterized by the file format information defining how the digital signal is encoded.

4. A method for protecting a digital signal, comprising the steps of:

providing a digital signal comprising digital data and file format information defining how the digital signal is encoded;

creating a predetermined key to manipulate the digital signal wherein the predetermined key comprises one or more mask sets having random or pseudo-random series of bits, the method further comprising the step of:

validating the one or more mask sets before manipulating the file format information using the predetermined key;

wherein said step of validating comprises the steps of:

generating a digital signature using the one or more mask sets; and comparing the digital signature with a predetermined digital signature; and manipulating the digital signal using the predetermined key to generate at least one permutation of the digital signal parameterized by the file format information defining how the digital signal is encoded.

5. A method for protecting a digital signal, comprising the steps of:

providing a digital signal comprising digital data and file format information defining how the digital signal is encoded;

creating a predetermined key to manipulate the digital signal wherein the predetermined key comprises one or more mask sets having random or pseudo-random series of bits, the method further comprising the step of:

authenticating the one or more mask sets by comparing a generated digital signature with a predetermined digital signature; and manipulating the digital signal using the predetermined key to generate at least one permutation of the digital signal parameterized by the file format information defining how the digital signal is encoded.

6. A method for protecting a digital signal, comprising the steps of:

providing a digital signal comprising digital data and file format information defining how the digital signal is encoded;

creating a predetermined key to manipulate the digital signal further comprising the step of:

computing a secure one way hash function of data in the digital signal, wherein the secure one way hash function is insensitive to changes introduced into the digital signal during the step of file format manipulation and;

manipulating the digital signal using the predetermined key to generate at least one permutation of the digital signal parameterized by the file format information defining how the digital signal is encoded.

7. A method for protecting digital data, where the digital data is organized into a plurality of frames, each frame having i) a header comprising file format information and ii) at least a portion of the digital data, said method comprising the steps of:

creating a predetermined key to manipulate the file format information in one or more of the plurality of frames wherein the file format information defines how the digital data is encoded wherein the predetermined key comprises a private key that is associated with a key pair; and manipulating the file format information using the predetermined key in at least two of the plurality of frames wherein the file format information defines how the digital data is encoded, such that the digital data will be perceived by a human as noticeably altered if it is played without using a decode key to restore the file format information to a prior state.

* * * * *

UNITED STATES PATENT AND TRADEMARK OFFICE
CERTIFICATE OF CORRECTION

PATENT NO.       : 7,664,263 B2                                              Page 1 of 1
APPLICATION NO. : 10/602777
DATED            : February 16, 2010
INVENTOR(S)      : Scott A. Moskowitz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1891 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,664,263 B2 | Page 1 of 1 |
| APPLICATION NO. | : 10/602777 | |
| DATED | : February 16, 2010 | |
| INVENTOR(S) | : Moskowitz | |

It is certified that error appears in the above-identified patent and that said Letters Patent is hereby corrected as shown below:

Column 1 lines 8-14 reading:
-- This application is a continuation application of U.S. patent application Ser. No. 09/046,627 (now awaiting issuance), which is a continuation of U.S. patent application Ser. No, 08/587,943, filed Jan. 17, 1996, (which issued Apr. 28, 1998, as U.S. Pat. No. 5,745,943). The entire disclosure of U.S. patent application ser. No. 09/046,627 is hereby incorporated by reference. -- should read:
-- This application is a continuation of application No. 09/046,627, filed March 24, 1998, now Pat. No. 6,598,162, issued July 22, 2003. The entire disclosure of application No. 09/046,627 is hereby incorporated by reference. --

Signed and Sealed this
Fifth Day of April, 2011

David J. Kappos
*Director of the United States Patent and Trademark Office*